Aug. 4, 1931.  O. E. CLARK  1,817,736
HOIST
Filed May 14, 1928  7 Sheets-Sheet 1

Inventor
Omer E. Clark
By
Attorney

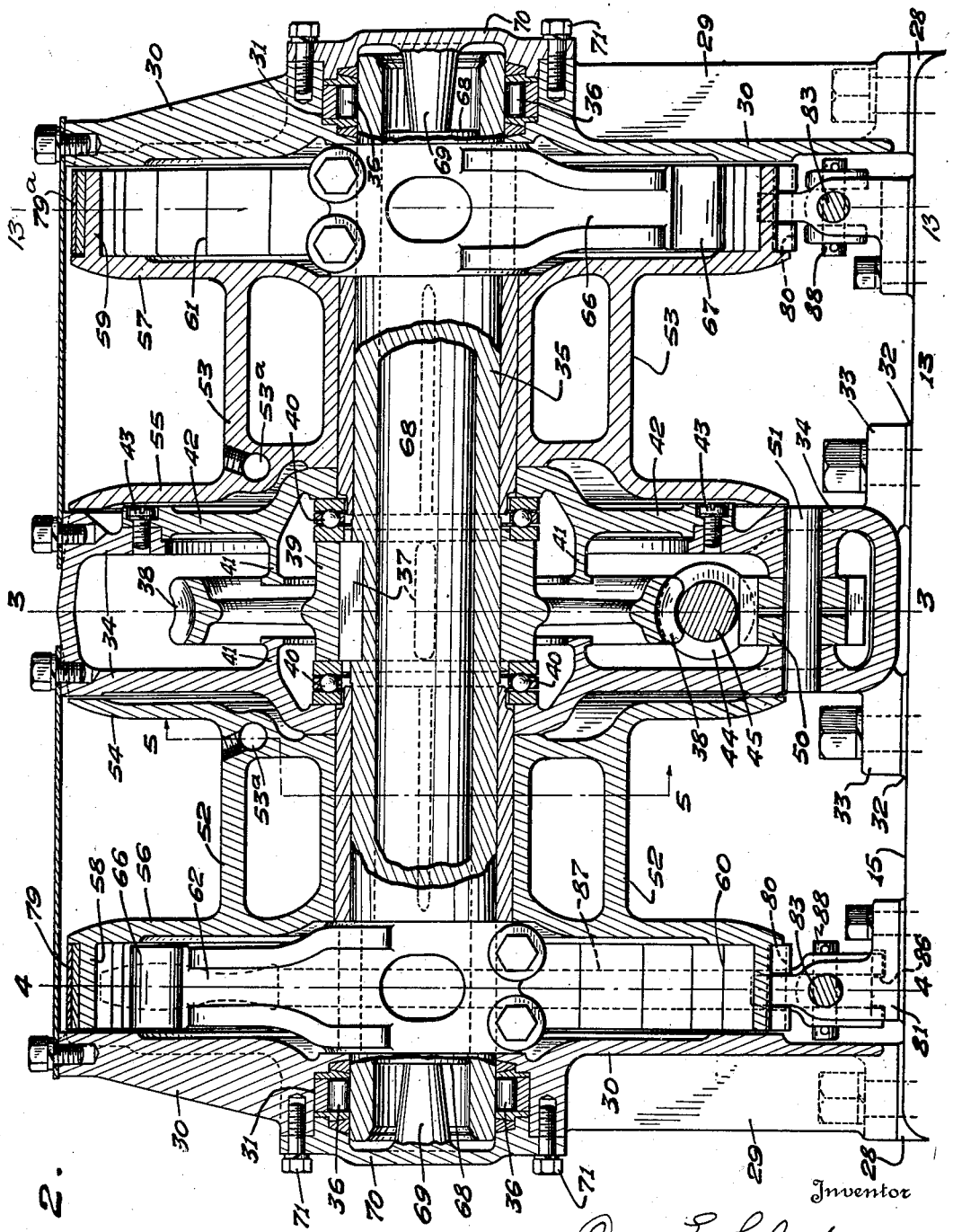

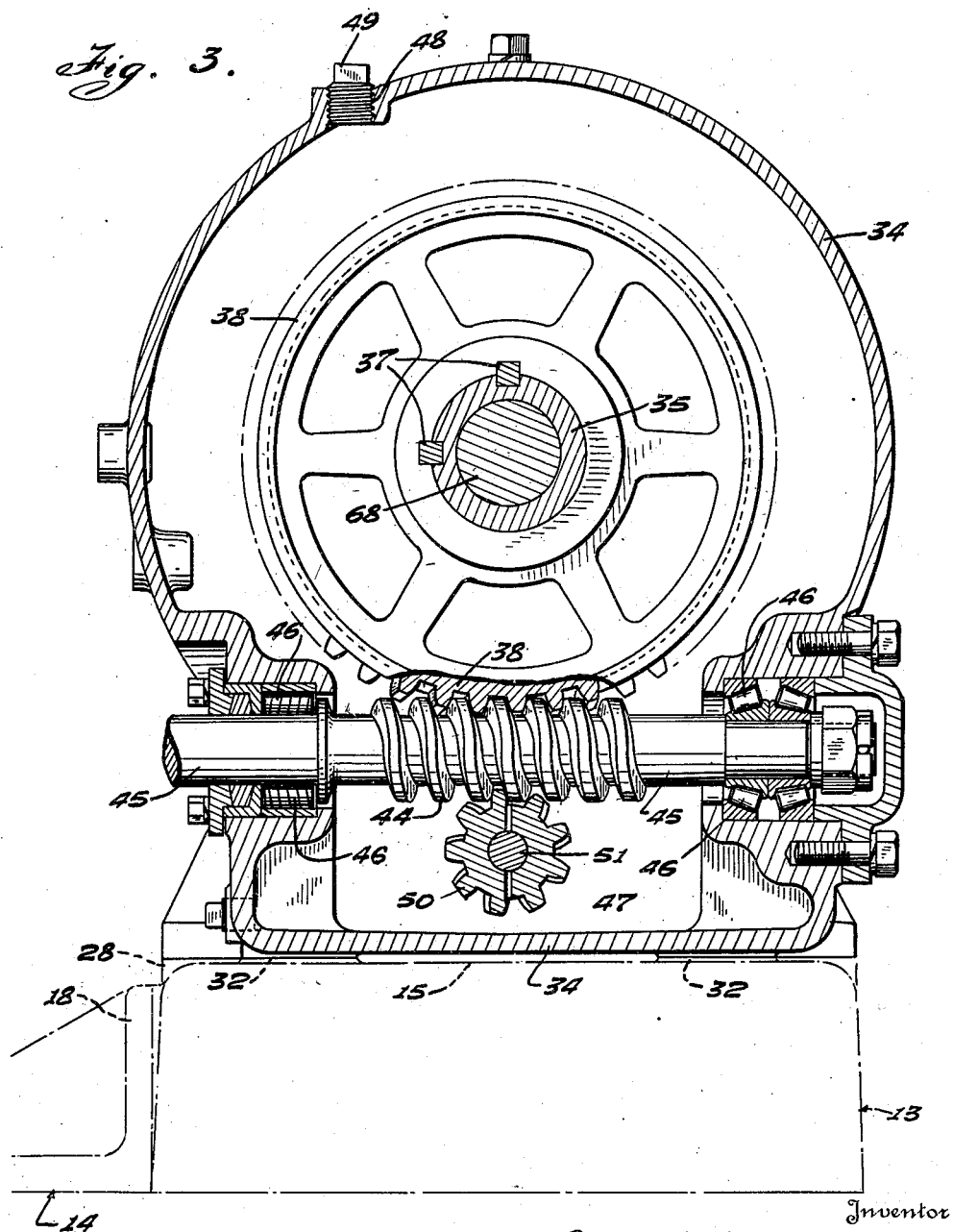

Aug. 4, 1931. O. E. CLARK 1,817,736
HOIST
Filed May 14, 1928 7 Sheets-Sheet 4

Inventor
Owen E. Clark
By
Attorney

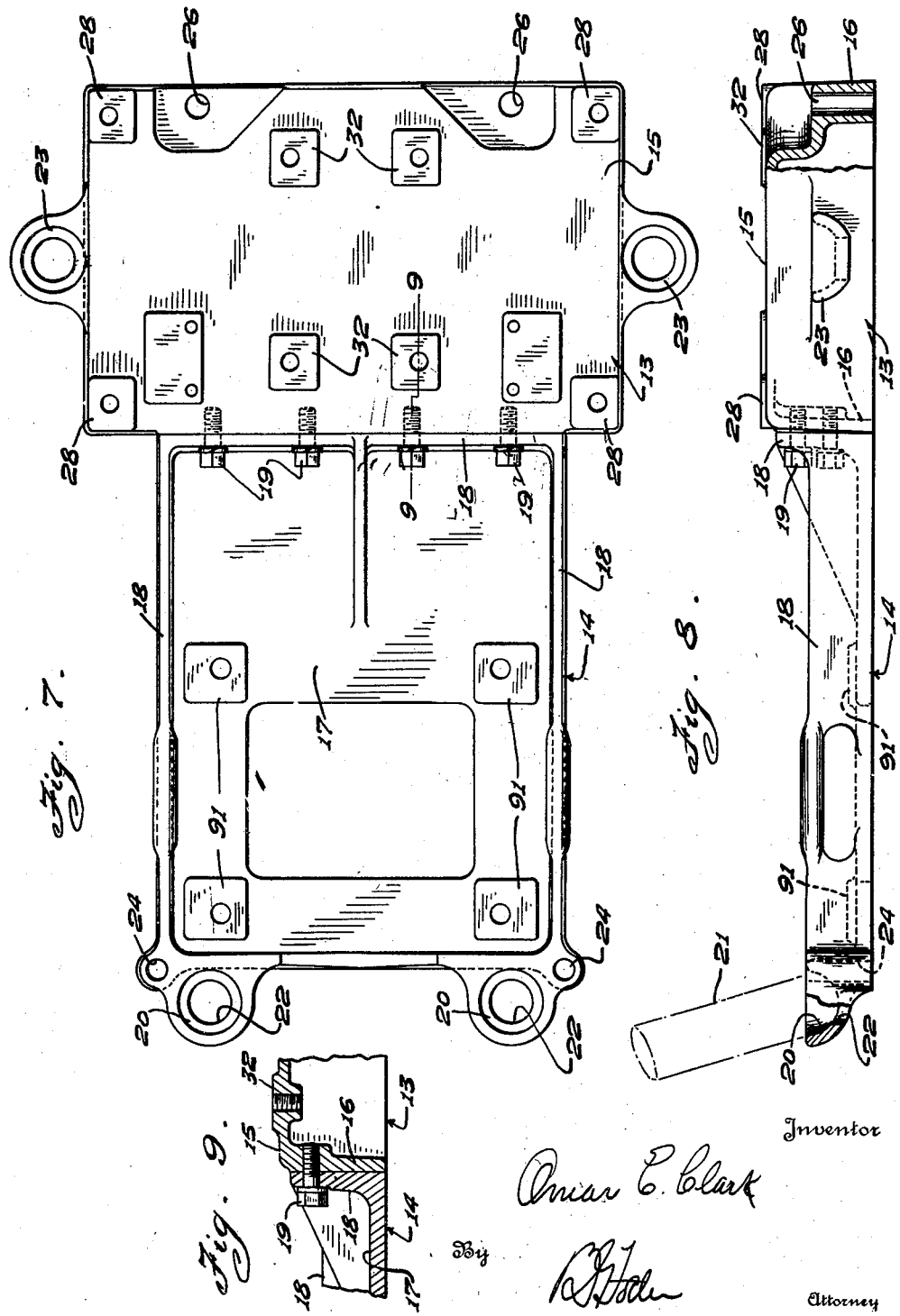

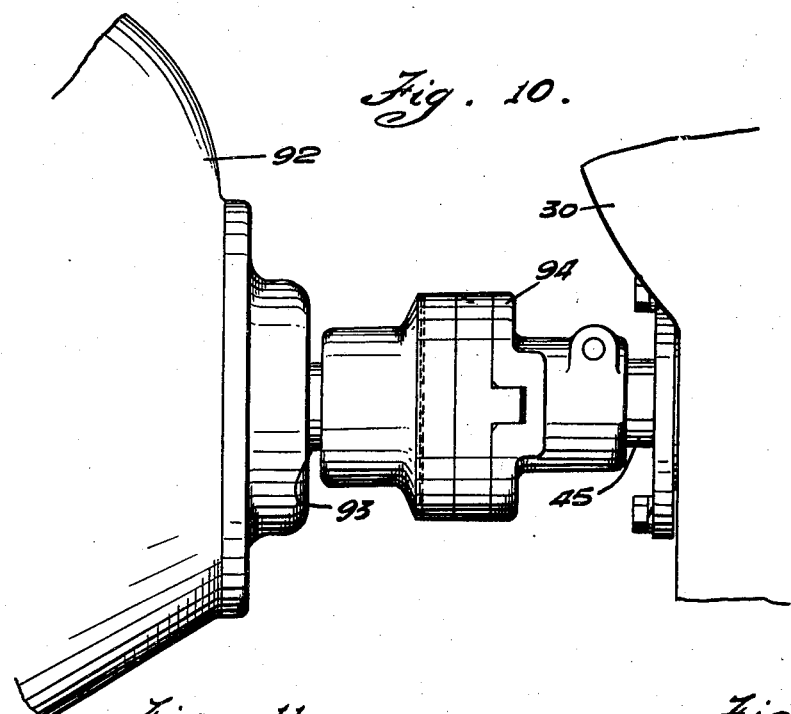
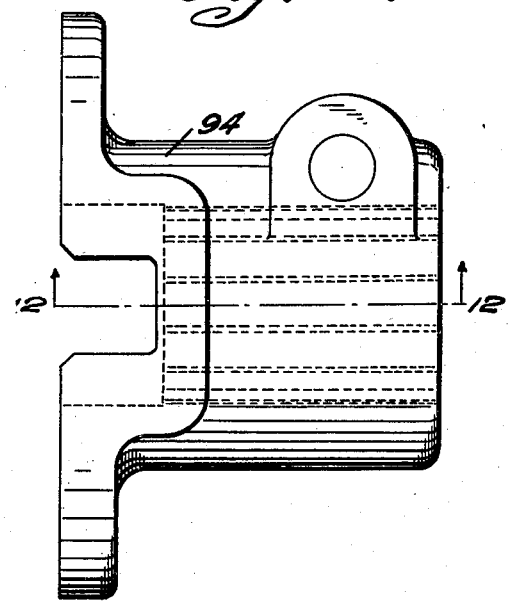
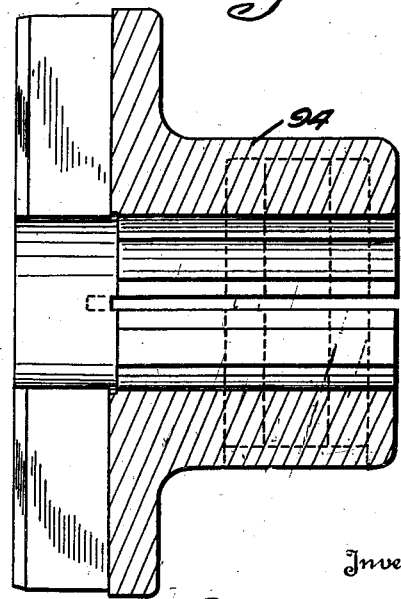

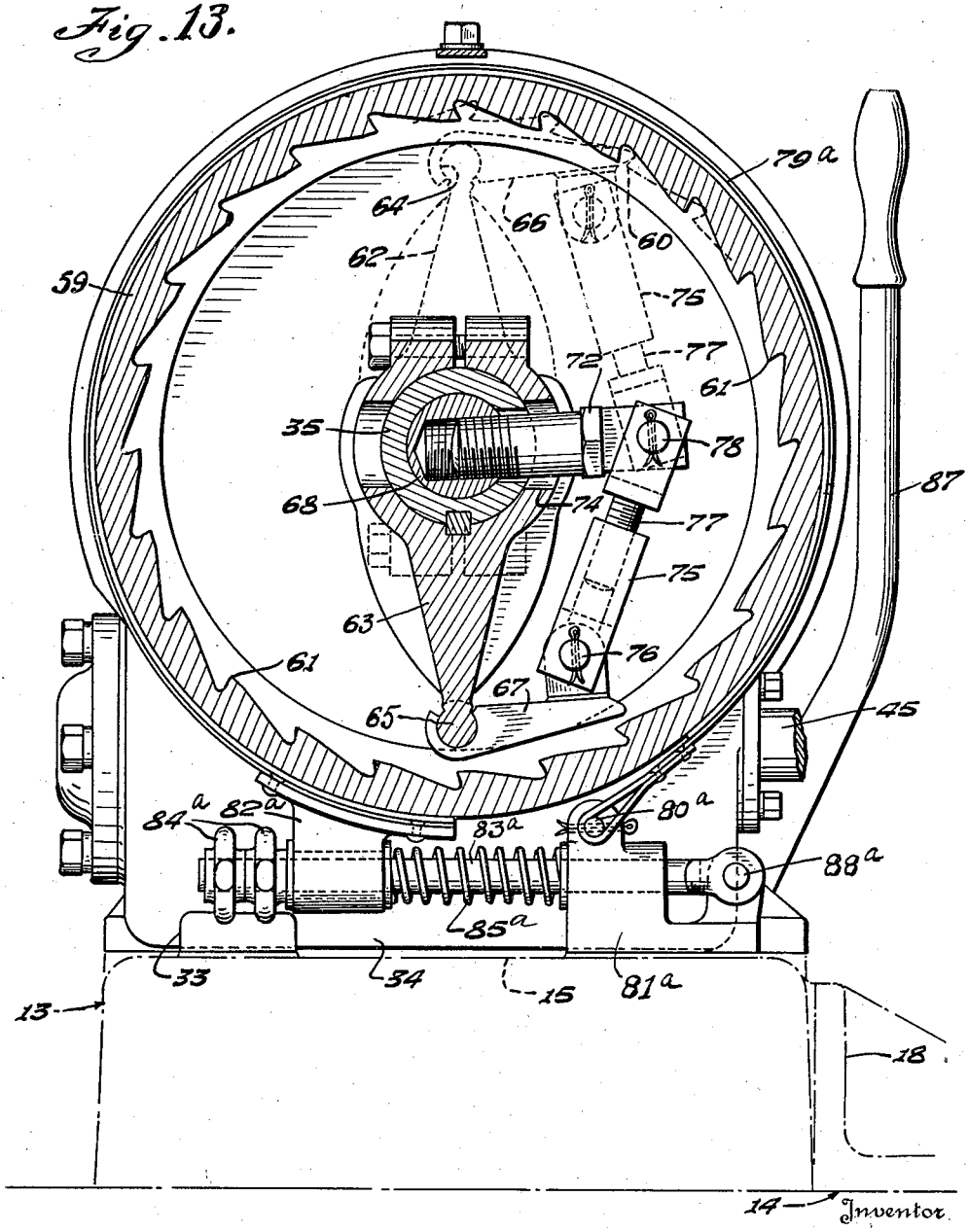

Patented Aug. 4, 1931

1,817,736

UNITED STATES PATENT OFFICE

OMAR E. CLARK, OF DENVER, COLORADO, ASSIGNOR TO GARDNER-DENVER COMPANY, OF DENVER, COLORADO, A CORPORATION OF DELAWARE

HOIST

Application filed May 14, 1928. Serial No. 277,625.

The present invention relates to hoists, and in its specific aspect, to that type in which two drums are employed with automatic means for connecting either to the driving mechanism, according to the direction in which said driving mechanism is operated.

The object is to provide a simple, effective and novel mechanism that is peculiarly compact, and is especially adapted for transportation from one point to another, thus making it desirable for use in confined places, such as mines and the like.

In the accompanying drawings:

Figure 2 is a sectional view on an enlarged scale on the line 2—2 of Figure 1.

Figure 3 is a cross sectional view on the line 3—3 of Figure 2.

Figure 7 is a plan view of the base in assembled position.

Figure 8 is a side view of the same.

Figure 9 is a detail sectional view on the line 9—9 of Figure 7.

Figure 10 is a detail view of the coupling between the motor shaft and worm shaft.

Figure 11 is a detail side elevation of one of the coupling elements.

Figure 12 is a longitudinal sectional view thereof, on the line 12—12 of Figure 11.

Figure 13 is a cross sectional view on the line 13—13 of Figure 2.

Figure 1:
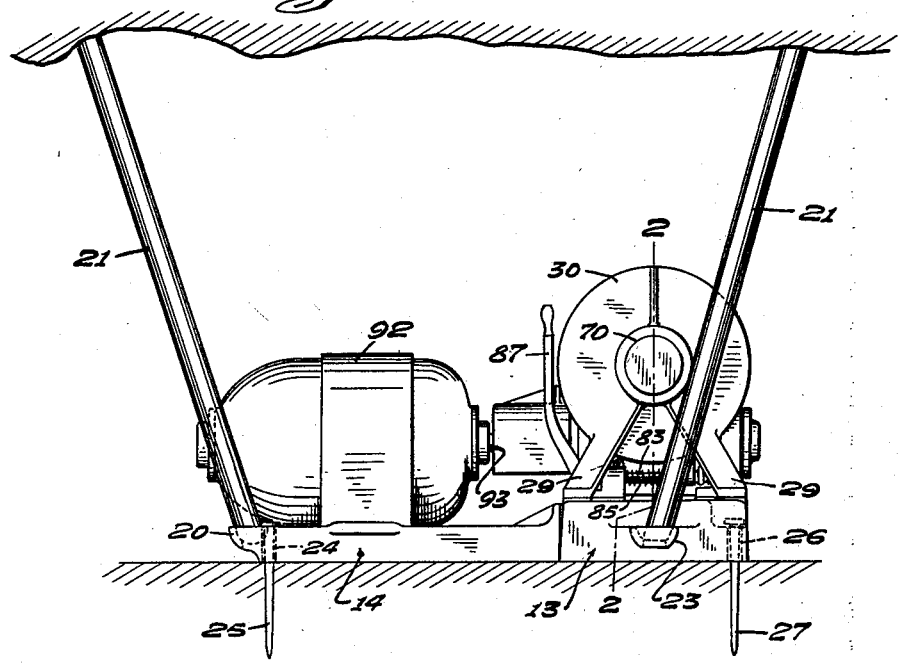
Figure 1 is a side elevation of the preferred embodiment of the invention.
Figure 6:
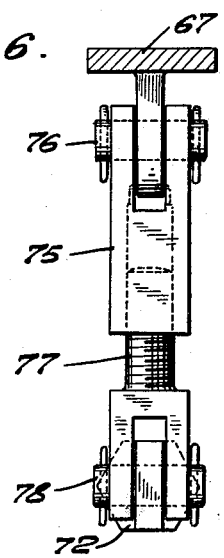
Figure 6 is a detail side elevation of the coupling link between one of the clutch pawls and its controlling arm.
Figure 5:
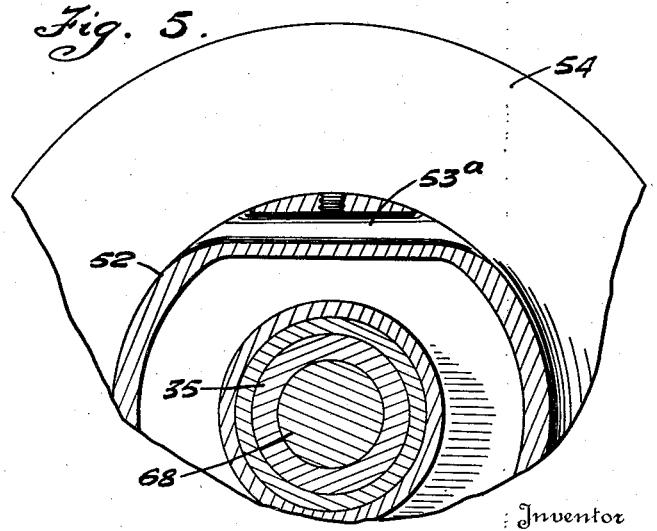
Figure 5 is a detail sectional view on the line 5—5 of Figure 2.

In the embodiment disclosed, a support is employed, comprising two bases 13 and 14. The base 13 supports the drum mechanism. The base 14 supports the motor. The base 13 is in the form of a shell, comprising a platform 15 with depending side flanges 16. The base 14 comprises a bottom 17 with upstanding side flanges 18. One of these side flanges abuts against one of the depending side flanges 16 of the base 13 and the flanges are secured together by cap bolts 19 passing through the flange 18 and threaded into the abutting flange 16. As a consequence the parts are securely held together and yet can be readily separated.

On the outer or free end of the base 14 are projecting cups 20 adapted to receive the lower ends of braces 21, these cups preferably having bottom openings 22 to prevent the accumulation of dirt therein. The sides of the base 13 are provided with corresponding outstanding cups 23 for the same purpose. In the outer corners of the base 14 are formed openings 24 through which holding pegs as 25 can be driven (see Fig. 1). The outer side of the base 13 is provided with correspondingly shaped openings 26 for the reception of holding pegs 27.

The platform 15 of the base 13 is provided at its corners with flat seats 28 (see Fig. 7), and bolted to said seats are standards 29 carrying closure plates or heads 30, in which are formed journal boxes 31. The platform 15 furthermore has on its central portion four seats 32, on which are bolted the feet 33 of a casing 34, centrally arranged between the standards 29 and head plates 30.

A tubular shaft 35 has its ends mounted in roller bearings 36 in the boxes 31, and said shaft passes through the central portion of the casing 34. Keyed to this shaft, as shown at 37, and located in the casing 34, is a worm gear 38, and interposed between the hub 39 of said worm gear and the opposite side walls of the casing 34, are thrust bearings 40. These thrust bearings are preferably enclosed by hood walls 41 projecting inwardly from the side walls of the casing 34, and spaced from the hub 39. One of the side walls of said casing 34 preferably has a detachable portion 42 held by cap screws 43, and permitting the introduction of the worm gear to and its removal from the casing. The worm gear is in mesh with a worm 44 carried by a drive shaft member 45 that extends into the lower portion of the casing 34, and is provided with suitable bearings 46 in the walls of the casing. The lower portion of said casing constitutes an oil reservoir or well 47, which may be filled through an opening 48 in the top portion of the casing, said opening being normally closed by a removable plug 49. In order to lubricate the worm and thereby transmit oil to the various parts, a lubricant conveying gear 50 is journaled on a pin 51 in the well 47 and is in mesh with the lower side of the worm 44.

Loosely journaled on the shaft 35 in the spaces between the head walls 30 and the casing 34, are two winding drums 52 and 53. The inner heads 54 and 55 of said drums are located adjacent to the side walls of the casing 34. Each drum has a socket 53a for the reception of the cable end. The outer heads 56 and 57 are provided with outstanding flanges 58 and 59, whose outer edges are adjacent to the inner faces of the head walls 30, thereby forming with said walls, enclosed chambers. The said flanges 58 and 59 are provided on their inner sides with clutch teeth 60 and 61, the teeth 61 being reversely arranged to the teeth 60 in a manner well understood.

Fixed to the tubular shaft 35 and located within the chambers above mentioned are carrier or driver arms 62 and 63 that are preferably diametrically opposite. These arms terminate in knuckle heads 64 and 65, and on said heads are journaled oppositely acting clutch pawls 66 and 67 adapted to respectively engage the teeth 60 and 61 of the two drums. Located within the shaft 35 is a rock shaft 68 that is allowed a limited amount of rotary movement with respect to the shaft 35. This rock shaft 68 is held against longitudinal movement by bearing studs 69 (see Figure 2), abutting the ends of said shaft 68 and carried by caps 70 bolted, as shown at 71, to the head walls 30. The rock shaft 68 has secured to it laterally projecting controlling arms 72 that pass through slots 73 formed in the shaft 35 and through slots 74 formed in the hubs of the driver arms 62 and 63. Connecting the outer ends of the arms 72 and the pawls 66 and 67 are extensible links, each consisting of a sleeve 75 pivoted to the pawl as shown at 76, and a shank 77 threaded into the sleeve 75 and pivotally connected, as shown at 78 to the arm 72. It will be understood that there are two of these arms 72, one at each end of the rock shaft.

For the purpose of holding the drums, the peripheral faces of the flanges 58 and 59 constitute braking surfaces that are surrounded by brake bands 79 and 79a. One end of the brake band 79 that surrounds the "take-up" drum 52 is secured, as shown at 80 to a bracket 81 fastened to the base 13. The other end is secured to a movable bracket 82 through which passes a rod 83 adjustably held by lock nuts 84. The rod 83 slidably passes through the bracket 81 and a coiled spring 85 is interposed between said brackets. The bracket 81 is formed with a guideway 86, and an actuating lever 87 having a pivotal connection 88 with the rod 83, is provided with cam abutment faces 89 having a bearing against a collar 90 that abuts the bracket 81. Obviously therefore by swinging the lever 87 the band 79 can be brought into frictional engagement with the periphery of the flange 58 it surrounds.

The "let-off" drum 53 has much the same brake mechanism except that no hand lever is used and there is just sufficient friction constantly applied to the drum to prevent its overrunning. Therefore as shown in Figure 13 the brake band 79a has one end anchored at 80a to a fixed bracket 81a. Its other end is secured to a movable bracket 82a. A connecting rod 83a between the brackets has adjusting nuts 84a coacting with the movable bracket 82a and a spring 85a is interposed between the brackets. In this instance the rod 83a is secured at 88a to the fixed bracket 81a. By adjusting the nuts 84a varying degrees of tension can be brought upon the band 79a, with consequent different degrees of frictional resistance to the rotation of the drum.

The platform 17 of the base 14 is provided with upstanding seats 91, on which is fixed a reversible motor 92 that may be an electric motor. This motor is provided with a drive shaft member 93 alined with the worm shaft member 45, and the two members are connected by a detachable universal coupling 94.

Figure 4:
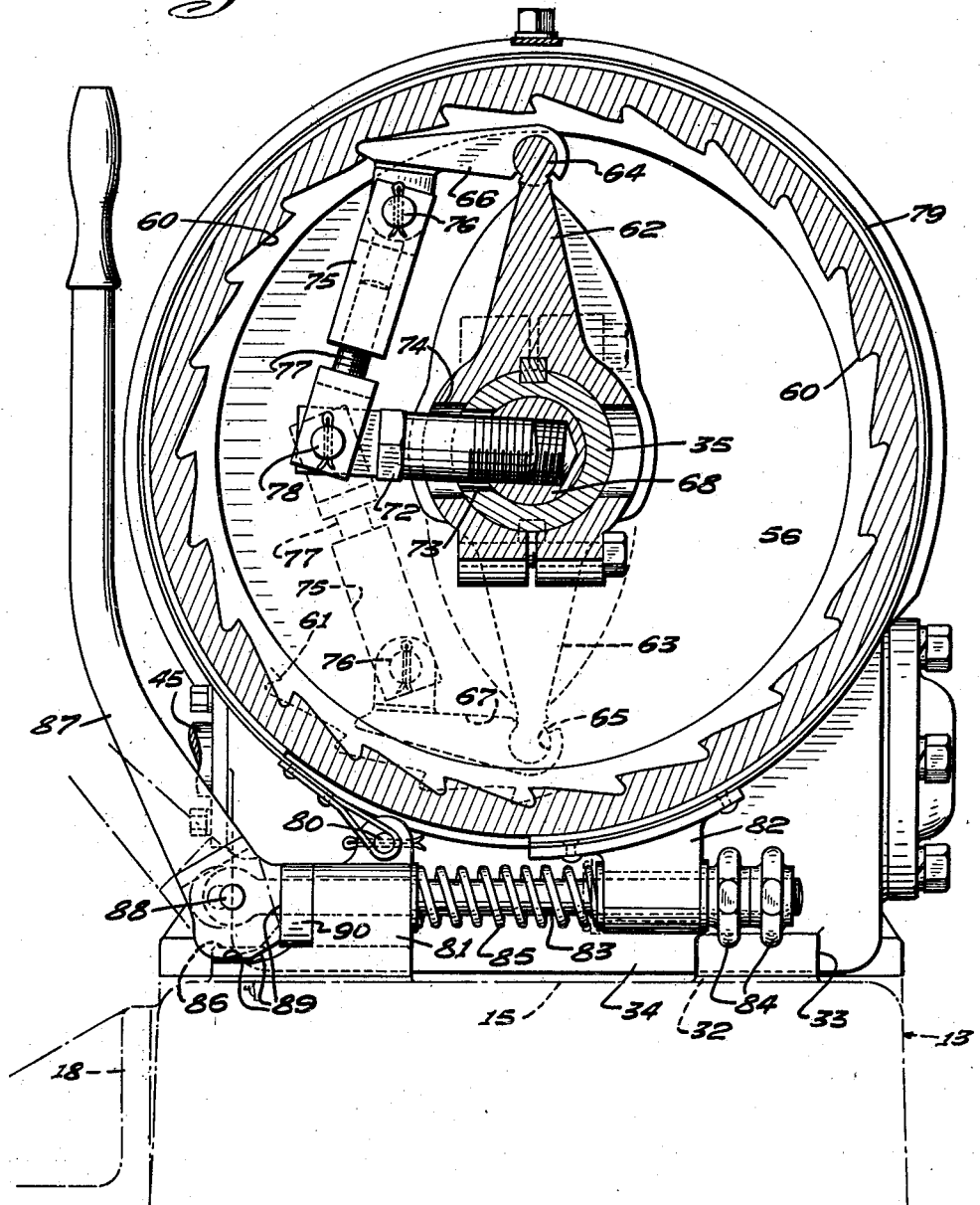
Figure 4 is a cross sectional view on the line 4—4 of Figure 2.

When the apparatus is assembled and secured by braces and pegs, as shown in Figure 1, it is effectively held in its operative position. If the motor is driven in one direction, the shaft 45 will drive the tubular shaft 35 in one direction through the worm 44 and worm wheel 38. Referring to Figure 4 and assuming that the shaft 35 is started to the left, or in a counter-clockwise direction, the arm 62 will move to the left but primarily the arm 72 will remain stationary. As a consequence the pawl 66 will be tilted outwardly and caused to engage behind one of the teeth 60. The drum 52 will therefore be rotated. The other pawl 67, will, however, be operated in the opposite direction, that is to say, the arm 63 will move to the right and as the other arm 72 initially remains stationary, the link will pull the pawl 67 inwardly away from the teeth 61. Consequently the drum 53 is released and is free to rotate. When the direction of the motor and consequently of the driving shaft 35 is reversed, the pawl 66 will be withdrawn from the teeth 60 while the pawl 67 will be moved outwardly and therefore the drum 53 will be automatically clutched and driven while the drum 52 will be released.

By reason of the motor and drum mechanism being mounted on separate and separable bases and a detachable coupling being employed between the motor shaft 93 and the worm shaft 45, the two instruments can be readily separated and yet in themselves remain assembled on their bases. Each can therefore be transported independently of the other and the parts of course readily reassembled. This makes it peculiarly convenient for moving the hoist from place to place and setting it up in a confined position, as in a mine.

From the foregoing, it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

What I claim, is:

1. In a hoist, the combination with a reversibly rotatable driving shaft and separately rotatable drums, of an automatic clutch mounted on the driving shaft and connecting it and one drum when the shaft is rotated in one direction, another and separate automatic clutch also mounted on the driving shaft and connecting it with the other drum when the shaft is rotated in the opposite direction, and means mounted solely on the shaft for automatically shifting said clutches upon the reversal of the motion of the shaft.

2. In a hoist, the combination with a drive shaft, of separately rotatable drums arranged end to end on the drive shaft, an automatic clutch mounted on the shaft at the outer end of each drum and having movable connections with the shaft, and said clutch being automatically shifted by the shaft for respectively connecting said shaft to one or the other of the drums according to the direction in which the shaft is rotated.

3. In a hoist, the combination with a drive shaft, of separately rotatable drums located end to end on the shaft, a driving mechanism connected to the shaft between the drums, an automatic clutch mounted on the shaft at the outer end of each drum for respectively connecting and disconnecting the shaft to one or the other of the drums according to the direction in which the shaft is rotated, means connecting the clutch to the shaft, and said shaft automatically shifting the clutches to automatically cause their connection and disconnection and also effecting their rotary movements.

4. In a hoist, the combination with a drive shaft, of separately rotatable drums located end to end on the shaft, and having oppositely disposed annular series of clutch teeth at their outer ends, a driving mechanism connected to the shaft between the drums, arms carried by the shaft and located at the outer ends of the drums, oppositely acting pawls carried by the arms and operating on the clutch teeth, and means rotating with the shaft and operating on the pawls to cause one or the other to engage the teeth according to the direction in which the shaft is rotated.

5. In a hoist, the combination with a rotatable shaft, of drums located end to end on the shaft and separately rotatable thereabout, said drums having oppositely arranged clutch teeth, arms fixed to the shaft, and oppositely acting pawls carried respectively by the arms and operating respectively on the teeth.

6. In a hoist, the combination with a rotatable shaft, of drums located end to end on the shaft and separately rotatable thereabout, said drums having oppositely arranged clutch teeth, arms fixed to the shaft, oppositely acting pawls carried respectively by the arms and operating respectively on the teeth, and means carried by the shaft and operating on the pawls to effect the movement of one into coaction with the teeth of one drum and the other out of coaction with the teeth of the other drum, and vice versa according to the direction in which the shaft is rotated.

7. In a hoist, the combination with a rotatable tubular shaft, and a rock shaft journaled therein, of drums located end to end on the shafts and having oppositely set clutch teeth, arms fixed to the tubular shaft, oppositely acting pawls pivoted on the arms and operating respectively on the teeth of the different drums, arms carried by the rock shaft and projecting beyond the tubular shaft, and links connecting the rock shaft arms and the pawls.

8. In a hoist, the combination with a rotatable tubular shaft and a rock shaft journaled therein, of drums located end to end on the shafts and having oppositely set clutch teeth at their outer ends, means engaged with the tubular shaft between its ends for rotating it in opposite directions, arms fixed to the tubular shaft at the outer ends of the drums, oppositely acting pawls pivoted on the arms and operating respectively on the teeth of the different drums, arms carried by the rock shaft and projecting beyond the tubular shaft, said tubular shaft being slotted to permit the passage of the rock shaft arms, and links connecting the rock shaft arms and the pawls.

In testimony whereof, I affix my signature.

OMAR E. CLARK.